United States Patent
Sanders et al.

(10) Patent No.: US 9,097,526 B1
(45) Date of Patent: Aug. 4, 2015

(54) SYSTEMS AND METHODS FOR A POLARIZATION MATCHED RESONATOR FIBER OPTIC GYROSCOPE

(71) Applicant: Honeywell International Inc., Morristown, NJ (US)

(72) Inventors: Glen A. Sanders, Scottsdale, AZ (US); Lee K. Strandjord, Tonka Bay, MN (US); Tiequn Qiu, Glendale, AZ (US); Jianfeng Wu, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/158,641

(22) Filed: Jan. 17, 2014

(51) Int. Cl.
  *G01C 19/72* (2006.01)
  *G02F 1/225* (2006.01)
  *G02F 2/00* (2006.01)

(52) U.S. Cl.
  CPC ............ *G01C 19/722* (2013.01); *G02F 1/2252* (2013.01); *G02F 2/00* (2013.01)

(58) Field of Classification Search
  CPC ........ G01C 19/00; G01C 19/64; G01C 19/72; G01C 19/721; G01C 19/722
  USPC .......................................... 356/460, 461, 464
  See application file for complete search history.

(56) References Cited

U.S. PATENT DOCUMENTS 4,588,296 A   5/1986 Cahill et al.
4,881,817 A * 11/1989 Kim et al. ...................... 356/460

5,270,791 A * 12/1993 Lefevre et al. ................ 356/460
(Continued)

FOREIGN PATENT DOCUMENTS

EP   1783456    5/2007
EP   2650644    10/2013

OTHER PUBLICATIONS

Jiang et al., "Transparent Electro-Optic Ceramics and Devices", "Optoelectronic Devices and Integration", Jan. 2005, pp. 380-394, vol. 5644, Publisher: IEEE.

(Continued)

*Primary Examiner* — Jonathan Hansen
(74) *Attorney, Agent, or Firm* — Fogg & Powers LLC

(57) ABSTRACT

Systems and methods for a polarization matched resonator fiber optic gyroscope are provided. In one embodiment an RFOG comprises: a light source; a fiber optic ring resonator; a photodetector that outputs an electrical signal that varies as a function of optical intensity; and an input light polarization servo. A light beam from the servo is launched into the resonator ring in a first direction of circulation. The input polarization servo comprises a birefringence modulator that modulates a phase shift between two components of an input polarization state of the light beam at $\omega_m$, the modulator is controlled to drive towards zero a $1^{st}$ harmonic of $\omega_m$ as measured in the electrical signal. The servo further comprises a tunable ½ waveplate that adjusts an amplitude of the two components of the input polarization state relative to each other. The tunable ½ waveplate is controlled to maximize a peak optical intensity as measured in the electrical signal.

20 Claims, 2 Drawing Sheets

(56) References Cited

U.S. PATENT DOCUMENTS

Figure 1:
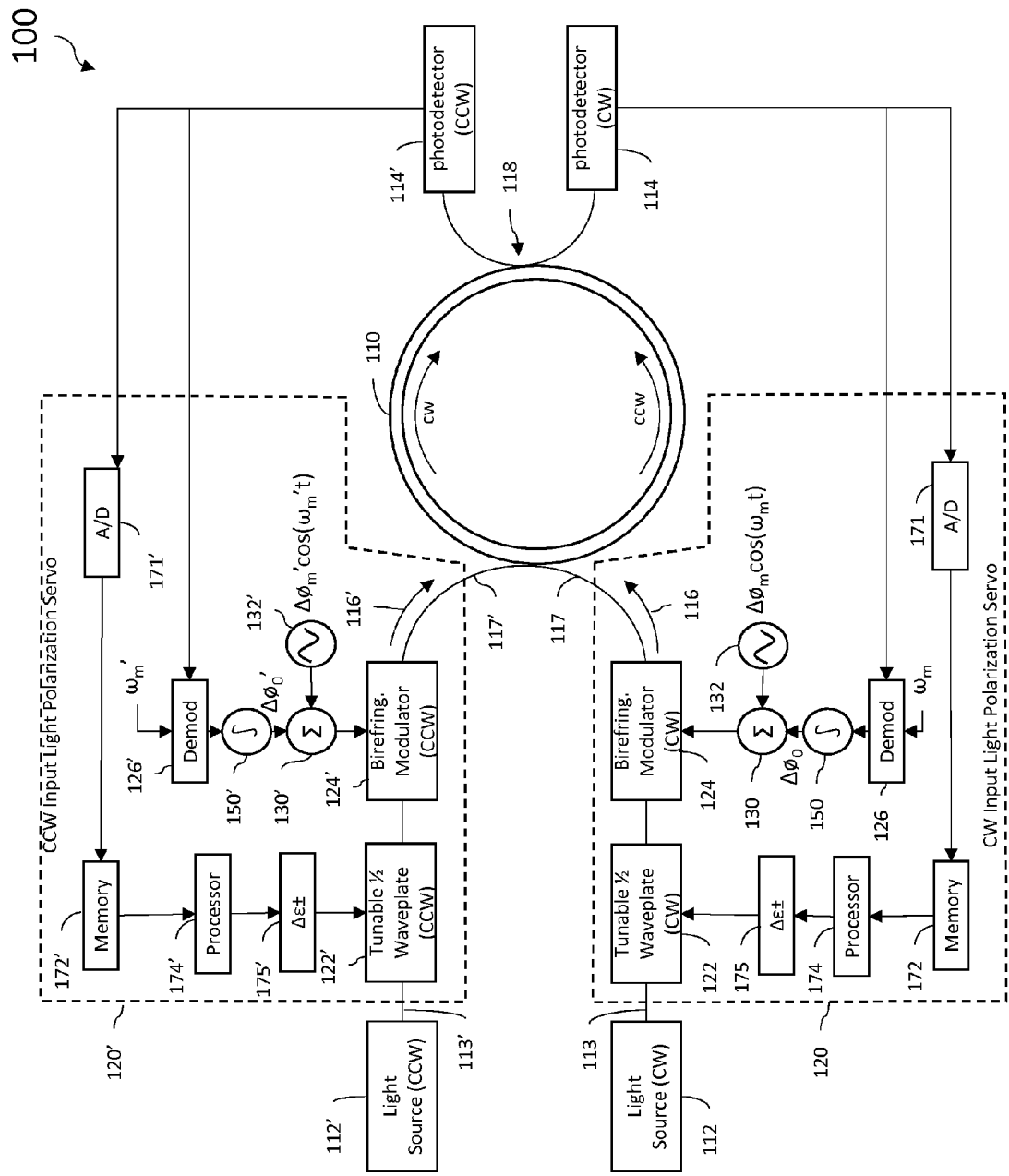

| | | | |
|---|---|---|---|
| 5,296,912 A * | 3/1994 | Strandjord et al. | 356/461 |
| 5,962,275 A * | 10/1999 | Horsch et al. | 435/97 |
| 8,085,407 B2 | 12/2011 | Qiu et al. | |
| 2007/0086015 A1 | 4/2007 | Sanders et al. | |
| 2007/0097375 A1 | 5/2007 | Sanders et al. | |
| 2008/0079947 A1 | 4/2008 | Sanders et al. | |
| 2010/0128277 A1 | 5/2010 | Qiu et al. | |

OTHER PUBLICATIONS

Lynch, "Orthogonal Polarization Fiber Optic Gyroscope with Improved Bias Drift", May 1999, pp. 1-76.

European Patent Office, "Extended European Search Report from EP Application No. 15150865.2 mailed Jun. 9, 2015", from Foreign Counterpart of U.S. Appl. No. 14/158,641, Jun. 9, 2015, p. 17, Published in: EP.

* cited by examiner

SYSTEMS AND METHODS FOR A POLARIZATION MATCHED RESONATOR FIBER OPTIC GYROSCOPE

BACKGROUND

In commercial navigation application, there is a continuing need for developing low cost, small sized navigation grade gyroscopes. The resonator fiber optic gyro (RFOG) is one gyroscope technology that can satisfy those needs. In the RFOG, a ring resonator is formed using a fiber optic coil and couplers to couple light into and out of the ring resonator in clockwise (cw) and counterclockwise (ccw) directions. At least two input light waves are frequency-tuned to the resonances of the ring resonator in the cw and ccw directions respectively. After measuring the resonance frequencies in the two directions by tuning each input beam to them, the input beam frequencies are compared, and the difference is proportional to the rotation rate of the resonator coil. In an RFOG bias instability is manifested as an indicated rotation rate output even when the gyroscope is not rotating.

For the reasons stated above and for other reasons stated below which will become apparent to those skilled in the art upon reading and understanding the specification, there is a need in the art for improved systems and methods to address RFOG bias instability.

SUMMARY

The embodiments of the present invention provide methods and systems for polarization matched resonator fiber optic gyroscope and will be understood by reading and studying the following specification.

In one embodiment, a polarization matched resonator fiber optic gyroscope (RFOG) comprises: a first light source; a fiber optic ring resonator coupled to the first light source; a first photodetector coupled to an output of the fiber optic ring resonator, where the first photodetector outputs an electrical signal that varies as a function of optical intensity measured by the first photodetector; and a first input light polarization servo; wherein the fiber optic ring resonator is coupled to the first light source via the first input light polarization servo such that a light beam from the first input light polarization servo is launched into the fiber optic resonator ring in a first direction of circulation; wherein the first input polarization servo comprises a birefringence modulator that modulates a phase shift between two components of the input polarization state of the light beam at a modulating frequency $\omega_m$, wherein the birefringence modulator is further controlled to drive towards zero a $1^{st}$ harmonic of the modulating frequency $\omega_m$ as measured in the electrical signal; wherein the first input polarization servo further comprises a tunable ½ waveplate that adjusts an amplitude of the two components on the input polarization state relative to each other, wherein the tunable ½ waveplate is controlled to maximize a peak optical intensity as measured in the electrical signal.

DRAWINGS

Figure 2:
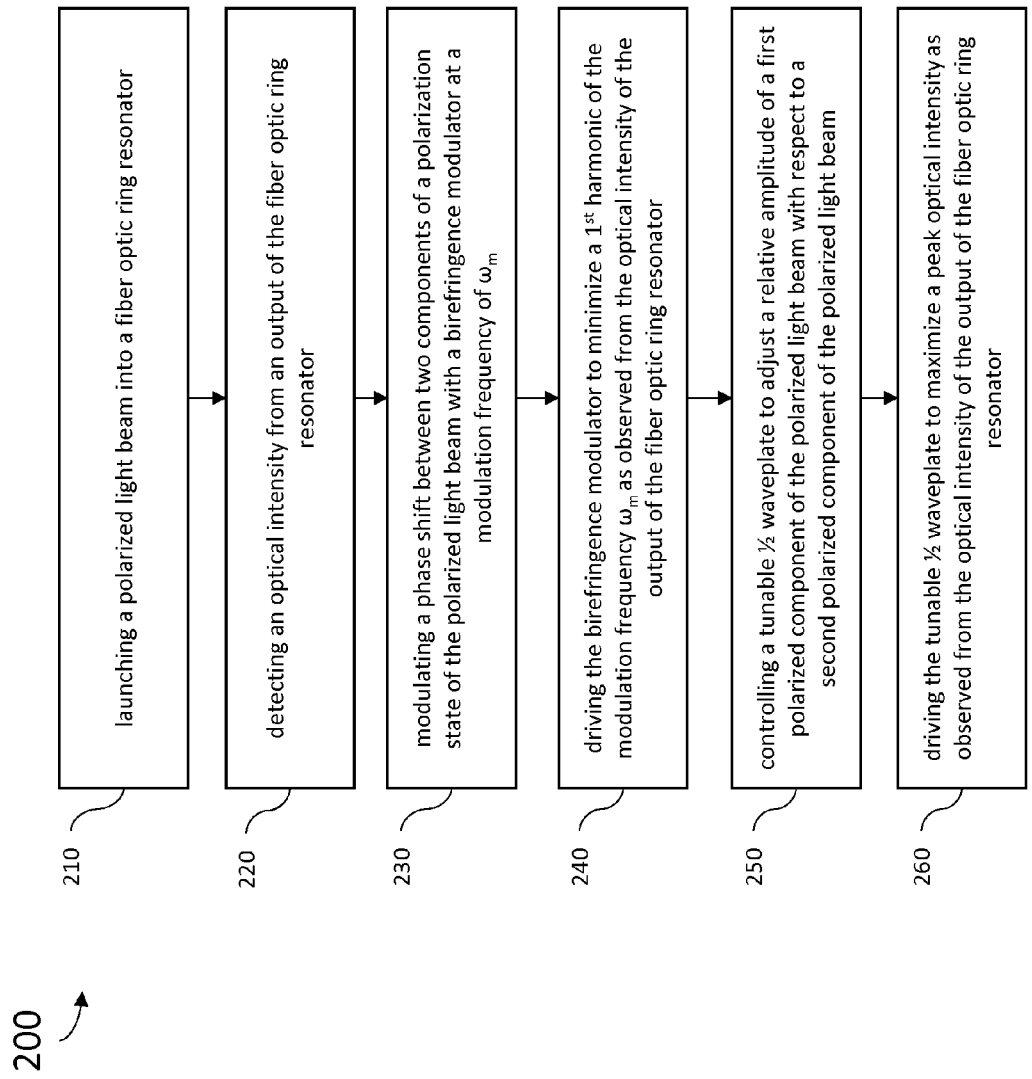

Embodiments of the present invention can be more easily understood and further advantages and uses thereof more readily apparent, when considered in view of the description of the preferred embodiments and the following figures in which:

FIG. 1 is a block diagram illustrating a polarization matched resonator fiber optic gyroscope of one embodiment of the present disclosure; and FIG. 2 is a flow chart illustrating a method of one embodiment of the present disclosure.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

One of the major causes of bias instability in RFOGs originates from the polarization of light that propagates within the gyroscope's ring resonator used to measure rotation. Errors in the indicated rotation rate of an RFOG can be caused by imperfect overlap of the input polarization states of light in the cw and ccw directions with the resonant polarization state of the fiber ring resonator. When the polarization state of the input light waves in each direction are matched with the resonator polarization state, errors due to polarization behavior in the RFOG can be greatly reduced or eliminated altogether.

One issue with achieving this matched condition is that there is polarization cross-coupling within the input beams paths to the resonator that keeps it from being in the exact desired polarization state at the input to the resonator. The existence of this cross-coupling in the input leads, as well as thermally induced fluctuations in the birefringence of the input leads, can cause the input light wave polarization state to fluctuate over time, causing the coupling of input light into the polarization state of the resonator to vary. The magnitude of the cross-coupling itself can vary over time. Furthermore, even if the input light state were completely stable at the entrance of the resonator, the polarization state inside the resonator at its input can vary over time, causing the overlap with the input polarization state to vary.

The various embodiments described herein provide systems and methods for very accurately launching the input light into one polarization mode within the ring resonator reducing bias instability within the RFOG. As described in detail below, one or more of these embodiments use active feedback to constantly adjust the input polarization state of the cw and ccw inputs beams to track and match the desired polarization state of the ring resonator.

FIG. 1 is a flow chart illustrating a polarization matched resonator fiber optic gyroscope (RFOG) 100 of one embodiment of the present invention. RFOG 100 comprises a fiber optic resonator ring 110 coupled to a first light source 112 via a first input light polarization servo 120. Light waves (shown at 116) exit from input light polarization servo 120 through input leads 117 and are launched into the resonator ring 110 where they circulate around the ring 110 in a clockwise (CW) direction. A fraction of the circulating CW light waves can be coupled out of resonator ring 110 (shown at 118) and detected by photodetector 114.

For simplicity, only components related to the CW operation of RFOG 100 are discussed in detail below. However, as shown in FIG. 1, RFOG 100 does comprise symmetrical set of counterclockwise components. That is, fiber optic resonator ring 110 is also coupled to a second light source 112' via a second input light polarization servo 120'. Light waves (shown at 116') exit from input light polarization servo 120' into an input lead 117' and are launched into the resonator ring 110. This light beam circulate around the ring 110 in a counter-clockwise (CCW) direction. A fraction of the circulating CCW light waves are coupled out of resonator ring 110 and detected by photodetector 114'. Primed (') reference indicators (i.e., x') are used to indicate elements relevant to CCW operation. Each of the primed components (e.g., 113', 116', 117', 122', 124', 126', 130', 132', 150', 171', 172', 174' and 175') associated with input light polarization servo 120' can be assumed to be functionally identical as those described for their like-named non-primed counterparts (113, 116, 117, 122, 124, 126, 130, 132, 150, 171, 172, 174 and 175' respectively) for input light polarization servo 120, except that their operation is applicable to launching the CCW circulating light beam. In some embodiments, the first and second light sources 112, 112' may actually comprise a single light source whose output is split into two beams that are separately fed into the appropriate CW and CCW components. Further, the first and second light sources 112, 112' may be implemented, for example using tunable lasers that produce monochromatic light beams.

As shown in FIG. 1, input light polarization servo 120 comprises a tunable ½ waveplate 122, a birefringence modulator 124, a first demodulator 126, a second demodulator 128, a summing amplifier 130 and a sinusoidal generator 132. The eigenstate of polarization for resonator ring 110, which will be referred to herein generally as the resonator polarization state, may be defined by two components X & Y and represented by the column matrix:

$$\begin{pmatrix} X \\ Y \end{pmatrix}, \text{ where X and Y are complex.}$$

where X and Y are complex.

The light within resonator ring 110 is already highly (but not perfectly) polarized so that the amplitude of the Y component may be defined by $\epsilon$ (where $\epsilon$ is $\ll 1$) which is equal to the relative amplitude of the Y component as compared to the amplitude of the X component. Thus the resonator polarization state may be represented by the normalized matrix:

$$b \begin{pmatrix} 1 \\ \epsilon e^{i\varphi} \end{pmatrix},$$

where $$b = \sqrt{\frac{1}{1+\epsilon^2}}$$

and $\phi$ is the phase difference between the X and Y components.

The light 113 entering input light polarization servo 120 is also already polarized into a similar polarization state, but the polarization state of light beam 113 will be mismatched with respect to the resonator polarization state. That is, $\epsilon$ for the polarization state of light 113 is off by $\Delta\epsilon$, while $\phi$ is off by $\Delta\phi$. The polarization state of light 113 entering input light polarization servo 120 can therefore be characterized by the normalized matrix:

$$a \begin{pmatrix} 1 \\ (\epsilon - \Delta\epsilon) e^{i(\varphi - \Delta\varphi)} \end{pmatrix}, \text{ where } a = \sqrt{\frac{1}{1+(\epsilon-\Delta\epsilon)^2}}$$

Thus if input light polarization servo 120 is operated to drive both $\Delta\epsilon$ E and $\Delta\phi$ of light beam 113 to zero, the polarization state of the launch light 116 will have the same polarization state as exists inside ring resonator 110.

To address $\Delta\phi$, input light polarization servo 120 comprises a birefringence modulator 124 positioned within the path of the light beam 113 prior to the ring resonator 110. Birefringence modulator 124 modulates the phase difference between the X-component and the Y-component of the launch light 116 (which is referred to herein as the input polarization state). There are various means for implementing birefringence modulator 124. For example, in one embodiment birefringence modulator 124 comprises a lithium niobate electro-optic phase modulator positioned along a principal axis of the input fiber 117 (which may comprise a length of polarization maintaining fiber). In another embodiment, an electro-optic transparent ceramic material is used, such as those manufactured at Boston Applied Technologies Incorporated (BATI).

In the example embodiment shown in FIG. 1, a voltage is applied to birefringence modulator 124 which controls birefringence modulator 124 and the modulation of the phase shift between the x-component and the y-component of the input polarization state of launch light 116. The voltage driving birefringence modulator 124 is actually the sum of two voltage components, which may be added together by a summing amplifier 130. The first voltage component, produced by a sinusoid generator 132 (which can comprise an oscillator or similar device), is characterized by the time varying function $\Delta\varnothing_m \cos(\omega_m t)$, where $\Delta\varnothing_m$ is a selected amplitude and $\omega_m$ is the modulation frequency. The second voltage component. $\Delta\varnothing_0$ is derived from a feedback signal provided by photodetector 114. The value of $\Delta\varnothing_0$ is a function of the $\Delta\phi$ difference. As discussed above, a ring resonator's eigenstate of polarization at its input can change over time and with changes in temperature. Observing the overlap between the resonator polarization state and the input state from the output of the ring resonator (as opposed to attempting to estimate a polarization state upstream from the ring resonator output) is believed to provide the best representation of the overlap, between input light polarization state and the resonator's true polarization state. The overlap between input state and the resonator state is a measure of the fraction of light energy from the input light wave is coupled into the resonator polarization state when the input frequency of light is adjusted to the resonance frequency of the resonator polarization state. The closer the fraction of light energy is to unity, the more perfect the overlap, which is the intent of this invention.

More specifically, the output intensity variation from ring resonator 110 at the peak of the resonance is sensed at $\omega_m$. It would be appreciated that signal processing methods known in the art may be used to control the cw and ccw input wave frequencies to the resonances centers of the cw and ccw resonances, respectively. Optical intensity observed by photodetector 114 is converted into an electrical signal which is fed into the first demodulator 126. The first demodulator 126 is also referred to herein as the 1$^{st}$ harmonic demodulator, because it demodulates the electrical signal from photodetector at the modulation frequency $\omega_m$. The output of the first demodulator 126 is a DC voltage or digital value proportional to $\Delta\phi$. The output of the first demodulator drives an integrator 150. In one embodiment, integrator 150 comprises a digital accumulator. The integrator 150 output ramps up in response to a non-zero output of the first demodulator 126, which results, in steady state, in a DC voltage component $\Delta\varnothing_0$ that is imparted to the birefringence modulator 124 to adjust $\Delta\phi$ such that $\Delta\phi=0$. If the input polarization state misalignment angle $\Delta\phi$ is equal to 0 originally, the output of the first demodulator is zero and the input to the integrator 150 is zero. Thus, the integrator 150 output is zero in steady state. If there is a change in $\Delta\phi$, such that $\Delta\phi\neq 0$, then there exists a phase difference between the X-component and the Y-component of the input polarization state of launch light 116 that is different than that of the resonator polarization state. Therefore, birefringence modulator 124 is driven to minimize changes in intensity (i.e., minimize AO at the phase modulation frequency $\omega_m$ so that a phase difference between the X and Y components is applied. In this case, when $\Delta\phi\neq 0$, in the detected output of the photodetector 114 at $\omega_m$ will be temporarily non-zero, the demodulated output of demodulator 126 will be temporarily non-zero, and the integrator 150 output will adjust the value of $\Delta\varnothing_0$ until steady state is reached. In steady state, the $\Delta\phi=0$, and therefore the detected signal at $\omega_m$ will be zero, as well as the demodulated output of the first demodulator. When $\Delta\varnothing_0$ is adjusted such that $\Delta\phi$ is driven to zero, variation at $\omega_m$ will vanish, indicating that the phase shift $\phi$ for the input polarization state of launch light 116 and the phase shift $\phi$ for the resonator polarization state match and $\Delta\phi$ has been driven to zero or minimized.

As mentioned above, input light polarization servo 120 is operated to drive both $\Delta\epsilon$ and $\Delta\phi$ of light beam 113 to zero. To ensure maximum matching of the input polarization state to the resonator polarization state, the relative amplitudes of the x-component and the y-component of the input polarization state may be adjusted to drive $\Delta\epsilon$ towards zero. To minimize $\Delta\epsilon$, input light polarization servo 120 also comprises a tunable ½ waveplate 122 positioned within the path of the light beam 113 prior to the ring resonator 110.

In the example embodiment shown in FIG. 1, a driving voltage may be applied to tunable ½ waveplate 122 which causes tunable ½ waveplate 122 to rotate its optical axis, thus affecting the relative amplitudes of the X-component and the Y-component of launch light 116. It would be appreciated that a ½ waveplate typically operates to take linear light and rotate the plane of linear polarization of that light. In the present case, the input state is very near linear, but does comprise an X-component and Y-component. Here rotating the axis of the ½ waveplate operates to shift part of the X-component light to the Y-component, and part of the Y-component light to the X-component. In this way, the relative amplitudes of the X and Y components are altered by the ½ waveplate 122.

This driving voltage that controls tunable ½ waveplate is derived from a feedback signal responsive the peak optical intensity of light received at photodetector 114. Optical intensity observed by photodetector 114 is sampled and converted into an electrical signal which is fed into a sampling analog-to-digital converter 171 within the input light polarization servo 120. The output of photodetector 114 as a function of time will comprise a DC component with a sinusoidal ripple riding on the DC component due to the application of modulation frequency $\omega_m$ by modulator 124. Input light polarization servo 120 is configured to capture the maximum optical intensity level observed during each cycle of modulation frequency $\omega_m$ and average that maximum optical intensity level over time to arrive at what is referred to herein as the peak optical intensity. Averaging the measured maximum optical intensity levels over time provides the benefit of averaging out random noise sources that may cause spikes observed during individual cycles.

More specifically, analog-to-digital converter (A/D) 171 generates optical intensity sample data that is stored in memory 172. Samples are captured and stored at a sufficient frequency to capture details such as the waveform peak of the electrical signal. For example, in one embodiment, samples of the electrical signal are obtained at a rate of 1000× per cycle of the modulation frequency $\omega_m$. Memory 172 stores sample data covering a sufficient number of cycles so that averaging the cycles of sample data stored in memory 172 effectively averages out random noise captured during individual cycles. For example, in some embodiments, memory 172 stores between 10 to 100 cycles of sample data. Alternately, in other embodiments, memory 172 may store an average of previously captured cycles and a weighted average is performed with data samples for the most recently captured cycle or cycles. The averaging of sample data stored in memory 172 is performed by processor 174 in order to arrive at the value of the peak optical intensity. Processor 172 further drives tunable ½ waveplate 122 via a waveplate controller 175 to maximize the peak optical intensity of light received at photodetector 114. That is, waveplate controller 175 produces the driving voltage that controls tunable ½ waveplate 122 based on a control signal from processor 172. Maximizing peak optical intensity of light received at photodetector 114 results in driving $\Delta\epsilon$ to zero.

In one embodiment, processor 172 maximizes peak optical intensity by observing the effects adjusting tunable ½ waveplate 122 has on the observed peak optical intensity. For example, if rotating the axis of tunable ½ waveplate 122 in one direction produces an increase in peak optical intensity, then peak optical intensity prior to the adjustment was not maximized. When a control point is found such that rotating the plane of linear polarization in either direction from that control point will produce a decrease in peak optical intensity, then peak optical intensity at that control point is maximized.

In one embodiment the $1^{st}$ feedback loop used for controlling $\Delta\phi$ is operated at higher bandwidth than the $2^{nd}$ feedback loop used for controlling $\Delta\epsilon$. Keeping the two loops separated in frequency space can be utilized to avoid conflicts between them. For example, in one embodiment where the $1^{st}$ harmonic feedback loop operates with 100 Hz bandwidth, the $2^{nd}$ harmonic feedback loop operates with 1-10 Hz since variations in phase error may be expected to occur at a greater frequency that variations in the relative amplitude error.

As explained above, the two major variables in the input polarization state of launch light 116, the polarization components' relative phase and amplitude, are adjusted to match that of the resonator polarization state of ring resonator 110. By controlling these variables in the launch light to match the resonator eigenstate, maximum power is coupled into the ring resonator 110 for maximum signal to noise, bias instabilities associated with interference from excitation of the second eignestate of the resonator are minimized or eliminated, and intensity fluctuations inside the resonator that give rise to optical Kerr effect variations (another bias instability mechanism) may be minimized.

FIG. 2 is a flow chart that illustrates a method 200 on one embodiment of the present disclosure for operating a polarization matched resonator fiber optic gyroscope. In one embodiment, the method 200 is performed using the elements shown in FIG. 1. In other embodiments, other elements may be utilized. Accordingly, any features, alternatives and optional implementations described with respect to FIG. 1 would be applicable to the method 200 of FIG. 2 and viseverse. Further, method 200 describes a process that may be applied to either the cw or ccw operation of an RFOG. Therefore, an RFOG configured to utilize method 200 can be expected to simultaneously perform two independent instances of method 200, one implemented with respect to the cw circulation of light in the ring resonator, one implemented with respect to the ccw circulation of light in the ring resonator.

The method begins at 210 with launching a polarized light beam into a fiber optic ring resonator. The polarized light may originate from a light source, such as a tunable laser that produce monochromatic light beams. The method continues to 220 with detecting an optical intensity from an output of the fiber optic ring resonator. Observing the signal from the output of the ring resonator is believed to provide the best representation of how well the input light polarization state is matched to the resonator's true polarization state. The method proceeds to 230 with modulating a phase shift between two components of the polarization state of the polarized light beam with a birefringence modulator at a modulation frequency of $\omega_m$. In one embodiment, the birefringence modulator is driven by a voltage having two components. The first component is characterized by the time varying function $\Delta\varnothing_m \cos(\omega_m t)$, where $\Delta\varnothing_m$ is a selected amplitude and $\omega_m$ is the modulation frequency. The second voltage component is the DC offset voltage, $\Delta\varnothing_0$ derived from a feedback signal derived from the optical intensity measurements obtained in block 220. Accordingly, the method proceeds to 240 with driving the birefringence modulator to minimize a $1^{st}$ harmonic of the modulation frequency $\omega_m$ as observed from the optical intensity of the output of the fiber optic ring resonator. As discussed above in FIG. 1, in one embodiment, the electrical signal produced by a photodetector measuring the optical intensity of the output of the fiber optic ring resonator can be demodulated at the modulation frequency $\omega_m$ in order to observe the $1^{st}$ harmonic. Minimizing this first harmonic will drive $\Delta\varnothing$ to zero, matching the phase angle between components of the launched light input polarization state to that of the resonator polarization state.

The method proceeds to 250 with controlling a tunable ½ waveplate to adjust a relative amplitude of a first polarized component of the polarized light beam with respect to a second polarized component of the polarized light beam. To ensure maximum matching of the input polarization state to the resonator polarization state, the relative amplitudes of the x-component and the y-component of the input polarization state can be adjusted to drive $\Delta\epsilon$ to zero. In the example embodiment shown in FIG. 1, a voltage is applied to tunable ½ waveplate 122 which causes tunable ½ waveplate 122 to rotate its optical axis, affecting the relative amplitudes of the X-component and the Y-components of launch light 116. Accordingly the method proceeds to 260 with driving the tunable ½ waveplate to maximize a peak optical intensity as observed from the output of the fiber optic ring resonator. In one embodiment, the optical intensity observed at block 220 is converted into an electrical signal which is sampled and stored in a memory. A processor may then determine a peak optical intensity, which can be calculated by averaging or otherwise statistically analyzing data samples captured over a plurality of modulating frequency $\omega_m$ cycles. A non-maximized peak optical intensity evidenced by observing the output of the ring resonator indicates that the relative amplitudes of the input polarization state components of launch light do not match those of the resonator polarization state. Accordingly, the tunable ½ waveplate at block 260 is therefore driven to generate feedback that drives the fiber optic resonator ring 110 to maximize peak optical intensity, which results in driving $\Delta\epsilon$ to zero.

Example Embodiments

Example 1 includes a polarization matched resonator fiber optic gyroscope (RFOG), the gyroscope comprising: a first light source; a fiber optic ring resonator coupled to the first light source; a first photodetector coupled to an output of the fiber optic ring resonator, where the first photodetector outputs an electrical signal that varies as a function of optical intensity measured by the first photodetector; and a first input light polarization servo, wherein the fiber optic ring resonator is coupled to the first light source via the first input light polarization servo such that a light beam from the first input light polarization servo is launched into the fiber optic resonator ring in a first direction of circulation; wherein the first input polarization servo comprises a birefringence modulator that modulates a phase shift between two components of an input polarization state of the light beam at a modulating frequency $\omega_m$, wherein the birefringence modulator is further controlled to drive towards zero a $1^{st}$ harmonic of the modulating frequency $\omega_m$ as measured in the electrical signal; and wherein the first input polarization servo further comprises a tunable ½ waveplate that adjusts an amplitude of the two components of the input polarization state relative to each other, wherein the tunable ½ waveplate is controlled to maximize a peak optical intensity as measured in the electrical signal.

Example 2 includes the gyroscope of example 1, further comprising: a second light source coupled to the fiber optic ring resonator; a second photodetector coupled to a second output of the fiber optic ring resonator, where the second photodetector outputs a second electrical signal that varies as a function of optical intensity measured by the second photodetector; and a second input light polarization servo; wherein the fiber optic ring resonator is coupled to the second light source via the second input light polarization servo such that a second light beam from the second input light polarization servo is launched into the fiber optic resonator ring in a second direction of circulation opposite from the first direction of circulation; wherein the second input polarization servo comprises a second birefringence modulator that modulates a second phase shift between two components of an input polarization state of the second light beam at a second modulating frequency $\omega_{m2}$, wherein the second birefringence modulator is further controlled to drive towards zero a $1^{st}$ harmonic of the second modulating frequency $\omega_{m2}$ as measured in the second electrical signal; and wherein the second input polarization servo further comprises a second tunable ½ waveplate that adjusts an amplitude of the two components of the input polarization state of the second light beam relative to each other, wherein the second tunable ½ waveplate is controlled to maximize a peak optical intensity as measured in the second electrical signal.

Example 3 includes the gyroscope of any of examples 1-2, the first input polarization servo further comprising: a sinusoid generator that outputs a first voltage component characterized by the time varying function $\Delta\varnothing_m \cos(\omega_m t)$, where $\Delta\varnothing_m$ is a selected amplitude and $\omega_m$ is the modulation frequency; and a $1^{st}$ harmonic demodulator coupled to the first photodetector, wherein the $1^{st}$ harmonic demodulator demodulates the electrical signal from first photodetector at the modulation frequency $\omega_m$; and an integrator that outputs a second voltage component $\Delta\varnothing_0$ from an output of the $1^{st}$ harmonic demodulator; wherein the phase shift between the two components of the input polarization state of the light beam applied by the birefringence modulator is controlled by a summation of the first voltage component with the second voltage component.

Example 4 includes the gyroscope of any of examples 1-3, wherein the second voltage component drives the birefringence modulator to minimize $\Delta\varnothing$.

Example 5 includes the gyroscope of any of examples 1-4, further comprising a summing amplifier that combines the first voltage component with the second voltage component.

Example 6 includes the gyroscope of any of examples 1-5, wherein the birefringence modulator comprises either: a lithium niobate electro-optic phase modulator, or an electro-optic transparent ceramic material.

Example 7 includes the gyroscope of any of examples 1-6, first input polarization servo further comprising: a processor that calculates the peak optical intensity from digital samples of the electrical signal from the first photodetector; and a waveplate controller responsive to the processor, where based on the peak optical intensity, the processor outputs a control signal instructing the waveplate controller to output a driving voltage applied to the tunable ½ waveplate; wherein the tunable ½ waveplate adjusts the amplitude of the two components of the input polarization state relative to each other based on the driving voltage.

Example 8 includes an input light polarization servo for a resonator fiber optic gyroscope (RFOG) comprising a ring resonator, a light source providing a polarized light beam, and a photodetector coupled to an output of the ring resonator, the servo comprising: a birefringence modulator configured to modulate a phase shift between two components of an input polarization state of the polarized light beam, where the birefringence modulator modulates the phase shift with a modulation frequency $\omega_m$, wherein the birefringence modulator is further configured to modulate the phase shift to minimize a $1^{st}$ harmonic of the modulation frequency $\omega_m$ as detected by the photodetector from the output of the ring resonator; and a tunable ½ waveplate that adjusts a relative amplitude of the two components of the input polarization state, wherein the tunable ½ waveplate is configured to maximize a peak optical intensity as detected by the photodetector from the output of the ring resonator.

Example 9 includes the servo of example 8, further comprising: a sinusoid generator coupled to the birefringence modulator, where the sinusoid generator outputs a sinusoidal voltage having the modulation frequency $\omega_m$, wherein the sinusoidal voltage is applied to the birefringence modulator to modulate the phase shift at the modulation frequency $\omega_m$; a $1^{st}$ harmonic demodulator coupled to the photodetector; and an integrator coupled to the $1^{st}$ harmonic demodulator; wherein the $1^{st}$ harmonic demodulator demodulates an electrical signal from the photodetector at the modulation frequency $\omega_m$ to produce an output to the integrator; wherein the integrator outputs a second voltage component $\Delta\phi_0$, wherein the second voltage component $\Delta\phi_0$ is applied to the birefringence modulator to further modulate the phase shift; and where the birefringence modulator is controlled by feedback from the second voltage component to drive the $1^{st}$ harmonic of the modulation frequency $\omega_m$ as detected from the electrical signal to a minimum.

Example 10 includes the servo of any of examples 8-9, further comprising a summing amplifier that combines the sinusoidal voltage with the second voltage component.

Example 11 includes the servo of any of examples 8-10, wherein the second voltage component drives the birefringence modulator to minimize $\Delta\phi$.

Example 12 includes the servo of any of examples 8-11, further comprising: a processor that calculates the peak optical intensity from digital samples of the electrical signal from the photodetector; and a waveplate controller responsive to the processor, where based on the peak optical intensity, the processor outputs a control signal instructing the waveplate controller to output a driving voltage; wherein the tunable ½ waveplate is controlled by feedback from the driving voltage to drive the peak optical intensity as detected from the electrical signal to a maximum.

Example 13 includes the servo of any of examples 8-12, wherein the birefringence modulator comprises either: a lithium niobate electro-optic phase modulator, or an electro-optic transparent ceramic material.

Example 14 includes a method for matching an input polarization state of launch light to a resonator polarization state of a resonator fiber optic gyroscope, the method comprising: launching a polarized light beam into a fiber optic ring resonator; detecting an optical intensity from an output of the fiber optic ring resonator; modulating a phase shift between two components of a polarization state of the polarized light beam with a birefringence modulator at a modulation frequency of $\omega_m$; driving the birefringence modulator to minimize a $1^{st}$ harmonic of the modulation frequency $\omega_m$ as observed from the optical intensity of the output of the fiber optic ring resonator; controlling a tunable ½ waveplate to adjust a relative amplitude of a first polarized component of the polarized light beam with respect to a second polarized component of the polarized light beam; and driving the tunable ½ waveplate to maximize a peak optical intensity as observed from the optical intensity of the output of the fiber optic ring resonator.

Example 15 includes the method of example 14, wherein launching the polarized light beam further comprises: producing a monochromatic light beam from a laser.

Example 16 includes the method of any of examples 14-15, wherein detecting the optical intensity from the output of the fiber optic ring resonator further comprises: measuring the optical intensity of the fiber optic ring resonator with a photodetector coupled to an output of the fiber optic ring resonator, where the photodetector outputs an electrical signal that varies as a function of optical intensity measured by the photodetector Example 17 includes the method of any of examples 14-16, wherein driving the birefringence modulator to minimize a $1^{st}$ harmonic of the modulation frequency $\omega_m$ as observed from the optical intensity of the output of the fiber optic ring resonator further comprises: demodulating the electrical signal from the photodetector at the modulation frequency $\omega_m$; and adjusting the phase shift between the two components of the polarization state to drive to a minimum the $1^{st}$ harmonic of the modulation frequency $\omega_m$ as detected from the demodulating.

Example 18 includes the method of any of examples 14-17, wherein driving the tunable ½ waveplate to maximize the peak optical intensity as observed from the optical intensity of the output of the fiber optic ring resonator further comprises: calculating the peak optical intensity from digital samples of the electrical signal; and controlling the tunable ½ waveplate to adjust an amplitude of the two components of the input polarization state relative to each other based on the peak optical intensity.

Example 19 includes the method of any of examples 14-18, wherein controlling a tunable ½ waveplate to adjust the relative amplitude of the first polarized component of the polarized light beam with respect to the second polarized component of the polarized light beam further comprises: rotating an optical axis of the tunable ½ waveplate.

Example 20 includes the method of any of examples 14-19, wherein modulating a phase shift between two components of the polarization state of the polarized light beam with a birefringence modulator at the modulation frequency of $\omega_m$ further comprises: driving the birefringence modulator with a voltage signal characterized by $\Delta\phi_m \cos(\omega_m t)$, where $\Delta\phi_m$ is a selected amplitude and $\omega_m$ is the modulation frequency.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A polarization matched resonator fiber optic gyroscope (RFOG), the gyroscope comprising:
    a first light source;
    a fiber optic ring resonator coupled to the first light source;
    a first photodetector coupled to an output of the fiber optic ring resonator, where the first photodetector outputs an electrical signal that varies as a function of optical intensity measured by the first photodetector; and
    a first input light polarization servo;
    wherein the fiber optic ring resonator is coupled to the first light source via the first input light polarization servo such that a light beam from the first input light polarization servo is launched into the fiber optic resonator ring in a first direction of circulation;
    wherein the first input polarization servo comprises a birefringence modulator that modulates a phase shift between two components of an input polarization state of the light beam at a modulating frequency $\omega_m$, wherein the birefringence modulator is further controlled to drive towards zero a $1^{st}$ harmonic of the modulating frequency $\omega_m$ as measured in the electrical signal; and
    wherein the first input polarization servo further comprises a tunable ½ waveplate that adjusts an amplitude of the two components of the input polarization state relative to each other, wherein the tunable ½ waveplate is controlled to maximize a peak optical intensity as measured in the electrical signal.

2. The gyroscope of claim 1, further comprising:
    a second light source coupled to the fiber optic ring resonator;
    a second photodetector coupled to a second output of the fiber optic ring resonator, where the second photodetector outputs a second electrical signal that varies as a function of optical intensity measured by the second photodetector; and
    a second input light polarization servo;
    wherein the fiber optic ring resonator is coupled to the second light source via the second input light polarization servo such that a second light beam from the second input light polarization servo is launched into the fiber optic resonator ring in a second direction of circulation opposite from the first direction of circulation;
    wherein the second input polarization servo comprises a second birefringence modulator that modulates a second phase shift between two components of an input polarization state of the second light beam at a second modulating frequency $\omega_{m2}$, wherein the second birefringence modulator is further controlled to drive towards zero a $1^{st}$ harmonic of the second modulating frequency $\omega$ as measured in the second electrical signal; and
    wherein the second input polarization servo further comprises a second tunable ½ waveplate that adjusts an amplitude of the two components of the input polarization state of the second light beam relative to each other, wherein the second tunable ½ waveplate is controlled to maximize a peak optical intensity as measured in the second electrical signal.

3. The gyroscope of claim 1, the first input polarization servo further comprising:
    a sinusoid generator that outputs a first voltage component characterized by the time varying function $\Delta\o_m \cos(\omega_m t)$, where $\Delta\o_m$ is a selected amplitude and $\omega_m$ is the modulation frequency;
    a $1^{st}$ harmonic demodulator coupled to the first photodetector, wherein the $1^{st}$ harmonic demodulator demodulates the electrical signal from first photodetector at the modulation frequency $\omega_m$; and
    an integrator that outputs a second voltage component $\Delta\o_0$ from an output of the $1^{st}$ harmonic demodulator;
    wherein the phase shift between the two components of the input polarization state of the light beam applied by the birefringence modulator is controlled by a summation of the first voltage component with the second voltage component.

4. The gyroscope of claim 3, wherein the second voltage component drives the birefringence modulator to minimize $\Delta\o$.

5. The gyroscope of claim 3, further comprising a summing amplifier that combines the first voltage component with the second voltage component.

6. The gyroscope of claim 3, wherein the birefringence modulator comprises either:
    a lithium niobate electro-optic phase modulator, or
    an electro-optic transparent ceramic material.

7. The gyroscope of claim 1, first input polarization servo further comprising:
    a processor that calculates the peak optical intensity from digital samples of the electrical signal from the first photodetector; and
    a waveplate controller responsive to the processor, where based on the peak optical intensity, the processor outputs a control signal instructing the waveplate controller to output a driving voltage applied to the tunable ½ waveplate;
    wherein the tunable ½ waveplate adjusts the amplitude of the two components of the input polarization state relative to each other based on the driving voltage.

8. An input light polarization servo for a resonator fiber optic gyroscope (RFOG) comprising a ring resonator, a light source providing a polarized light beam, and a photodetector coupled to an output of the ring resonator, the servo comprising:
    a birefringence modulator configured to modulate a phase shift between two components of an input polarization state of the polarized light beam, where the birefringence modulator modulates the phase shift with a modulation frequency $\omega_m$, wherein the birefringence modulator is further configured to modulate the phase shift to minimize a $1^{st}$ harmonic of the modulation frequency $\omega_m$ as detected by the photodetector from the output of the ring resonator; and
    a tunable ½ waveplate that rotates a plane of linear polarization of the polarized light beam to adjust a relative amplitude of the two components of the input polarization state, wherein the tunable ½ waveplate is configured to maximize a peak optical intensity as detected by the photodetector from the output of the ring resonator.

9. The servo of claim 8, further comprising:
    a sinusoid generator coupled to the birefringence modulator, where the sinusoid generator outputs a sinusoidal voltage having the modulation frequency $\omega_m$, wherein the sinusoidal voltage is applied to the birefringence modulator to modulate the phase shift at the modulation frequency $\omega_m$;

a 1<sup>st</sup> harmonic demodulator coupled to the photodetector; and an integrator coupled to the 1<sup>st</sup> harmonic demodulator;

wherein the 1<sup>st</sup> harmonic demodulator demodulates an electrical signal from the photodetector at the modulation frequency $\omega_m$ to produce an output to the integrator;

wherein the integrator outputs a second voltage component $\Delta\phi_0$, wherein the second voltage component $\Delta\phi_0$ is applied to the birefringence modulator to further modulate the phase shift; and where the birefringence modulator is controlled by feedback from the second voltage component to drive the 1<sup>st</sup> harmonic of the modulation frequency $\omega_m$ as detected from the electrical signal to a minimum.

10. The servo of claim 9, further comprising a summing amplifier that combines the sinusoidal voltage with the second voltage component.

11. The servo of claim 9, wherein the second voltage component drives the birefringence modulator to minimize $\Delta\phi_0$.

12. The servo of claim 8, further comprising:

a processor that calculates the peak optical intensity from digital samples of the electrical signal from the photodetector; and a waveplate controller responsive to the processor, where based on the peak optical intensity, the processor outputs a control signal instructing the waveplate controller to output a driving voltage;

wherein the tunable ½ waveplate is controlled by feedback from the driving voltage to drive the peak optical intensity as detected from the electrical signal to a maximum.

13. The servo of claim 8, wherein the birefringence modulator comprises either:

a lithium niobate electro-optic phase modulator, or an electro-optic transparent ceramic material.

14. A method for matching an input polarization state of launch light to a resonator polarization state of a resonator fiber optic gyroscope, the method comprising:

launching a polarized light beam into a fiber optic ring resonator;

detecting an optical intensity from an output of the fiber optic ring resonator;

modulating a phase shift between two components of a polarization state of the polarized light beam with a birefringence modulator at a modulation frequency of $\omega_m$;

driving the birefringence modulator to minimize a 1<sup>st</sup> harmonic of the modulation frequency $\omega_m$ as observed from the optical intensity of the output of the fiber optic ring resonator;

controlling a tunable ½ waveplate to adjust a relative amplitude of a first polarized component of the polarized light beam with respect to a second polarized component of the polarized light beam; and driving the tunable ½ waveplate to maximize a peak optical intensity as observed from the optical intensity of the output of the fiber optic ring resonator.

15. The method of claim 14, wherein launching the polarized light beam further comprises:

producing a monochromatic light beam from a laser.

16. The method of claim 14, wherein detecting the optical intensity from the output of the fiber optic ring resonator further comprises:

measuring the optical intensity of the fiber optic ring resonator with a photodetector coupled to an output of the fiber optic ring resonator, where the photodetector outputs an electrical signal that varies as a function of optical intensity measured by the photodetector.

17. The method of claim 16, wherein driving the birefringence modulator to minimize a 1<sup>st</sup> harmonic of the modulation frequency $\omega_m$ as observed from the optical intensity of the output of the fiber optic ring resonator further comprises:

demodulating the electrical signal from the photodetector at the modulation frequency $\omega_m$; and adjusting the phase shift between the two components of the polarization state to drive to a minimum the 1<sup>st</sup> harmonic of the modulation frequency $\omega_m$ as detected from the demodulating.

18. The method of claim 16, wherein driving the tunable ½ waveplate to maximize the peak optical intensity as observed from the optical intensity of the output of the fiber optic ring resonator further comprises:

calculating the peak optical intensity from digital samples of the electrical signal; and controlling the tunable ½ waveplate to adjust an amplitude of the two components of the input polarization state relative to each other based on the peak optical intensity.

19. The method of claim 14, wherein controlling a tunable ½ waveplate to adjust the relative amplitude of the first polarized component of the polarized light beam with respect to the second polarized component of the polarized light beam further comprises:

rotating an optical axis of the tunable ½ waveplate.

20. The method of claim 14, wherein modulating a phase shift between the two components of the polarization state of the polarized light beam with a birefringence modulator at the modulation frequency of $\omega_m$ further comprises:

driving the birefringence modulator with a voltage signal characterized by $\Delta\phi_m \cos(\omega_m t)$, where $\Delta\phi_m$ is a selected amplitude and $\omega_m$ is the modulation frequency.

* * * * *